June 6, 1950  H. L. McCORMICK  2,510,644
TORQUE LIMITING DEVICE
Filed May 24, 1945
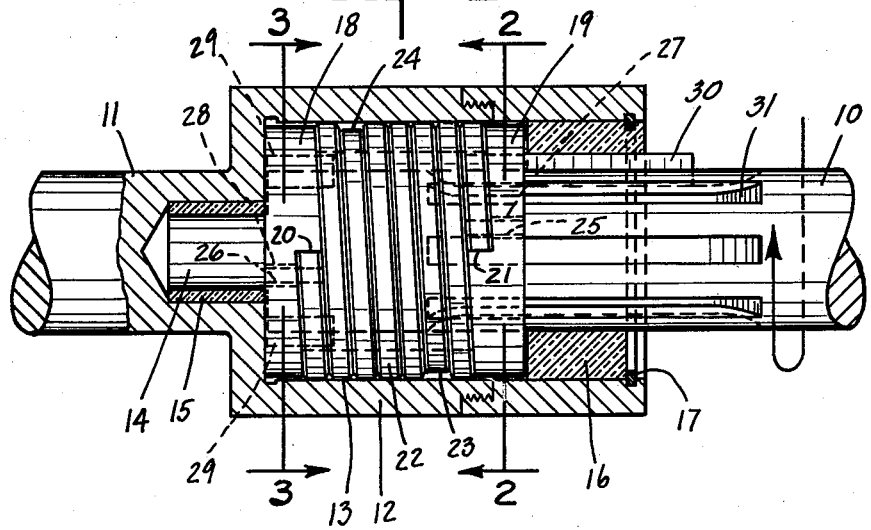
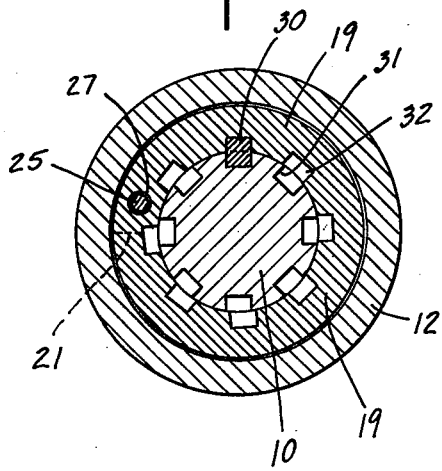 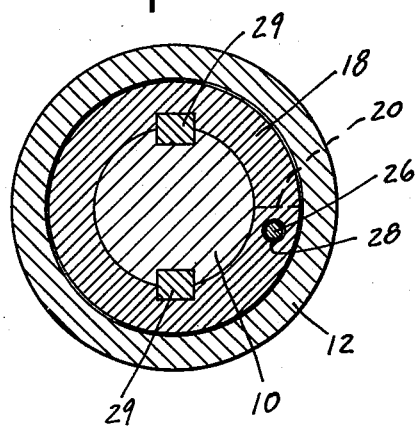
INVENTOR.
HAMILTON L. McCORMICK.
BY
Lockwood, Goldsmith & Galt,
ATTORNEYS.

Patented June 6, 1950

2,510,644

UNITED STATES PATENT OFFICE 2,510,644

TORQUE LIMITING DEVICE

Hamilton L. McCormick, Carmel, Ind., assignor to Fletcher Trust Company, Indianapolis, Ind., a corporation, trustee Application May 24, 1945, Serial No. 595,626

6 Claims. (Cl. 64—30)

This invention relates to a torque limiting device, and particularly a power transmitting clutch spring adapted to provide an interdriving connection between two members up to a predetermined torque or overload, whereupon it will be caused to declutch and thereby interrupt the driving connection between said members, reference being had in respect thereto to the application of William Carleton Starkey, Serial No. 508,601, filed November 1, 1943, entitled "Torque limiting device" now Patent No. 2,459,972 issued January 25, 1949.

In such devices it is desirable that they be adjusted and set to release at a predetermined overload, this invention being directed to provision for such adjustment or setting.

The invention is particularly applicable to that type of device wherein the driving member is provided with a pair of opposed load transmitting elements arranged to transmit a load through a torque or load sensitive spring of a resistance to hold them against relative rotation up to a predetermined load, subject to said spring yielding to permit such relative rotation therebetween as to declutch and thereby cause slippage of the power transmitting clutch spring.

The particular feature of the invention resides in the provision of a selective connection between the driving member and one of the load transmitting elements whereby it may be selectively displaced in respect to its opposed load transmitting element against the resistance of the torque spring to thereby set it for effecting release or slippage of the clutch at a predetermined torque load. This is accomplished by providing such driving member and load transmitting element with a plurality of angularly and increasingly offset keyways registrable at different angularly displaced positions therebetween to receive a driving key.

The full nature of the invention will be understood from the accompanying drawings and the following description and claims:

Fig. 1 is a side elevation of the overload release device with parts shown in section.

Fig. 2 is a section taken on the line 2—2 of Fig. 1.

Fig. 3 is a section taken on the line 3—3 of Fig. 1.

In the drawings there is shown one modification or application of the invention to a torque limiting device by way of illustration. In this type of device the driving action may be in either direction. However, for purposes of description it is herein illustrated as driving in the direction of the arrow, wherein there is provided a driving member or shaft 10 and a driven member or shaft 11. However, as above mentioned, the shaft 11 may become the driving member and the shaft 10 the driven member.

The shaft 11 is provided with a clutch pocket 12 having an internal clutch surface 13. The shaft 10 extends through the pocket with its end reduced to provide a bearing stud 14 supported in the bearing 15 carried by a recess formed in the shaft 11 at the end of the pocket. At the opposite end of the pocket there is provided a bearing 16 carried by the shaft rotatable within the pocket and locked therein by the locking ring 17.

The shaft 10 is provided with a pair of load transmitting elements in the form of collars 18, 19. With the shaft 10 as the driving member the collar 18 acts as an overload release element while the collar 19 acts as a driving element. Said collars are in the form of a helix to provide the shoulders 20, 21 respectively against which the ends of a driving clutch spring 22 bear. Both collars are keyed to the shaft 10, the overload release collar 18 being positively and fixedly keyed therto, whereas the driving collar 19 is adjustably keyed thereto.

In this particular form of the device, the clutch spring 22 is normally in clutching engagement with the clutch surface 13 of the pocket 12. Therefore, any drive transmitted from the shaft 10 to the end of the clutch 22 through the driving collar 19 and its shoulder 21, will be transmitted through said clutch to the pocket 12 and shaft 11.

The clutch 22 is formed with a relieved coil indicated at 23 which is spaced from the clutch surface throughout a substantial portion thereof to permit flexing under torsional load. Therefore, the coil 23 in this modification comprises a yielding torsion spring or load sensitive element. It is effective in the overload release action when the shaft 10 is the driving member rotated in the direction of the arrow. A complementary relieved coil indicated at 24 near the opposite end of the clutch provides a similar load sensitive element when the shaft 11 becomes the driving member. The clutch 22 carries at its opposite end portions exciter pins 25, 26. The pin 25 extends into an oversize slot 27 in the collar 19. Similarly the pin 26 extends into an oversize slot 28 in the collar 18.

The collar 18 is fixedly keyed to the shaft 10 by the keys 29 and the collar 19 is fixedly keyed to said shaft 10 by an elongated adjusting key 30. The shaft 10 is provided with a series of elongated keyways 31. Said keyways are spaced about the shaft 10 in increasingly offset positions relative to a corresponding series of similarly disposed registrable keyways 32 formed in the collar 19. As shown in Fig. 2, the offset relation between keyways 31 and 32 increase one degree about the shaft in a clockwise direction from the registering keyways. The key 30 is adapted to interlock the shaft and collar when inserted in registering keyways upon their angular adjustment to a predetermined unloading torque.

In operation, the shaft 10 will normally drive the shaft 11 through the clutch 22. The driving load being imparted to the spring clutch through abutment of shoulder 21 against the end thereof, the tendency will be to expand the clutch, thereby maintaining it in clutching engagement with the pocket. However, upon a predetermined torque load being applied to the clutch, the load sensitive element or coil 23 will be expanded, allowing a slight relative rotation between the unloading collar 18 and the clutch 22. In the particular form shown the yielding of the coil 23 and concomitant slipping of an adjacent limited number of endmost coils will permit the shaft 10 and collars 18, 19 to rotate slightly relative to the clutch 22, pocket 12 and shaft 11. When the power transmitted has reached a predetermined torque load, this expansion of coil 23 will be sufficient to permit the unloading collar 18 to be rotated until it engages the exciter pin 26 on the end of the clutch. The collar 18 moving with the shaft in the direction of the arrow will thereupon pull the end of the clutch spring in a direction to wrap it down to declutch or release it from clutching engagement with the pocket sufficient to permit slippage of the load carrying coils. As a result thereof, there will be a slippage of the clutch spring relative to the clutch pocket between the shafts 10 and 11. But immediately upon dissipation of such overload, the inherent expansive force of the various coils will cause them to immediately return to normal position so that the pocket will be clutched and the driving connection resumed. In operation the expansion of the load sensitive element 23 will be maintained at its critical point so as to permit the load to be transmitted up to but not beyond a predetermined torque load.

It is difficult, however, in producing such a device to so form the load sensitive element or coil 23 as to cause the clutch to release at a prescribed torque load. The clutch and coil 23 are, therefore, at a minimum torque load, whereupon the parts are assembled and the prescribed torque load applied while holding the shafts in fixed position. With the prescribed torque load applied, the collar 19 is angularly adjusted and set relative to the shaft to release the clutch. This is accomplished by rotating the collar 19 about the shaft and relative to the spring 22 and the collar 18 until the coil 23 has been expanded under the prescribed torque load, and to further expand it would release the clutch. In this position the collar 19 will have been angularly displaced relative to the shaft 10 to bring a keyway of one series into registry with one of the keyways of the other series. The elongated key 30 is then inserted in the registering keyways to interlock them in such adjusted angular relation. In this angular relationship, the resistance of the coil 23 will have been increased over the minimum to the degree required to permit of the relative rotation necessary for the releasing action at the predetermined torque overload.

In establishing a predetermined load limit, for example to cause the clutch to slip at 25 foot pounds, the two shafts 10 and 11 are held in fixed relation with the unloading collar 18 engaging the exciter pin 26. In this fixed position 25 foot pounds torque force is applied to the collar 19 in a clockwise direction, as indicated by the arrow. Under such torque force the collar will have been angularly displaced relative to the shaft 10, and the load sensitive element or reduced coil 23 will have been expanded under a predetermined strain and the adjacent end coil placed under the desired predetermined slip resistance. In such relative position the key 30 is inserted through the registering slots 31, 32 to maintain the collar and shaft in adjusted position. In this position the load sensitive element will be enabled to yield to permit relative movement between the shafts only at 25 foot pounds torque force, and thus cause the unloading collar 18 to actuate the exciter pin of the clutch to wrap it down to slipping position.

By means of this arrangement and pre-setting of the load sensitive element, it may be compensated for variations in production, due to die wear, Rockwell tests and the like. Thus, in effect the torque limiting device may be set at the proper yielding tension as the unit is assembled.

The invention claimed is:

1. A torque limiting device including a driving member, a driven member, one of said members being provided with a clutch engaging surface, a clutch spring normally in clutching engagement with said surface having a yielding load sensitive element operably associated therewith intermediate the other of said members and the portion of said clutch spring through which the driving force is transmitted, said element being adapted to yield under an overload to permit relative movement between said members, an unloading element carried by the other of said members movable upon said load sensitive element yielding under said overload to declutch said clutch spring and permit slippage thereof, a load transmitting collar operatively connected with said load sensitive element, said collar and the said other member each being provided with a series of openings spaced thereabout, the openings of one series being increasingly offset relative to and registrable with those of the other series, and an interlocking element engaged in opposed openings when in registry to secure said collar and member in adjusted angular relation to establish the overload at which said load sensitive element will yield to permit said relative movement.

2. A torque limiting device including a driving member, a driven member, one of said members being provided with a clutch engaging surface, a clutch spring normally in clutching engagement with said surface having a yielding load sensitive element operably associated therewith intermediate the other of said members and the portion of said clutch spring through which the driving force is transmitted, said element being adapted to yield under an overload to permit relative movement between said members, an unloading element carried by the other of said members movable upon said load sensitive element yielding under said overload to declutch said clutch spring and permit slippage thereof, a load transmitting collar operatively connected with said load sensitive element, said collar and the said other member each being provided with a series of keyways spaced thereabout, the keyways of one series being increased in angular spacing in respect to the keyways of the other series, and a driving key in selective interlocking engagement with opposed keyways when in registry to secure said collar and member in adjusted angular relation to establish the overload at which said load sensitive element will yield to said relative movement.

3. A torque limiting device including a driving member, a driven member, said driven member being provided with a clutch engaging pocket, a clutch spring normally in clutching engagement with said pocket, said clutch spring having a portion thereof formed to provide a load sensitive element, an unloading element secured to said driving member and connected with one end of said clutch spring, a load transmitting collar having driving connection with said load sensitive element, said load transmitting collar and driving member each being provided with a series of keyways spaced thereabout, the keyways of one series being increasingly spaced angularly from each other with respect to the keyways of the opposed series, and a driving key in selective interlocking engagement with opposed keyways when brought in registry to secure said collar and driving member in adjusted angular relation for placing said load sensitive element under tension to establish the overload at which it will yield and cause said unloading collar to declutch and permit slippage of said clutch spring.

4. A torque limiting device including a driving member, a driven member, one of said members being provided with a clutch engaging surface, a clutch spring normally in clutching engagement with said surface having a yielding load sensitive element operably associated therewith intermediate the other of said members and the portion of said clutch spring through which the driving force is transmitted, said element being adapted to yield under an overload to permit relative movement between said members, an unloading element carried by the other of said members movable upon said load sensitive element yielding under said overload to declutch said clutch spring and permit slippage thereof, a load transmitting collar operatively connected with said load sensitive element, said collar and the said other member each being provided with a plurality of openings spaced from each other, the openings on said collar being spaced a different distance apart from the openings on said member, and an interlocking element engaged in opposed openings when in registry to secure said collar and member in different angular relationship depending upon registry of the respective openings to establish the overload at which said load sensitive element will yield to said relative movement.

5. A torque limiting device including a driving member, a driven member, one of said members being provided with a clutch engaging surface, a clutch spring normally in clutching engagement with said surface having a yielding load sensitive element operably associated therewith intermediate the other of said members and the portion of said clutch spring through which the driving force is transmitted, said element being adapted to yield under an overload to permit relative movement between said members, an unloading element carried by the other of said members movable upon said load sensitive element yielding under said overload to declutch said clutch spring and permit slippage thereof, a load transmitting collar operatively connected with said load sensitive element, said collar and the said other member each being provided with a series of openings spaced thereabout, and one of said openings on said collar being in registry with one of said openings on said member and the remaining companion openings out of registry, and an interlocking element engaged in said registering openings to secure said collar and member in adjusted angular relationship to establish the overload at which said load sensitive element will yield to said relative movement.

6. A torque limiting device including a driving member, a driven member, one of said members being provided with a clutch engaging surface, a clutch spring normally in clutching engagement with said surface having a yielding load sensitive element operably associated therewith intermediate the other of said members and the portion of said clutch spring through which the driving force is transmitted, said element being adapted to yield under an overload to permit relative movement between said members, an unloading element carried by the other of said members movable upon said load sensitive element yielding under said overload to declutch said clutch spring and permit slippage thereof, a load transmitting collar operatively connected with said load sensitive element, said collar and the said other member being provided with a series of openings spaced thereabout, the openings of one series being variably spaced relative to the openings of the companion series, at least one of said openings of each series being registrable with at least one of the openings of the companion series, and an interlocking element engaged in the registering openings of each series to secure said collar and member in adjusted angular relation to establish the overload at which said load sensitive element will yield to said relative movement.

HAMILTON L. McCORMICK.

REFERENCES CITED

The following references are of record in the file of this patent:

UNITED STATES PATENTS

| Number | Name | Date |
| --- | --- | --- |
| 1,561,537 | Hayes | Nov. 17, 1925 |
| 2,360,187 | Almen | Oct. 10, 1944 |